Patented May 5, 1942

2,281,834

UNITED STATES PATENT OFFICE 2,281,834

SELF-HARDENING CEMENT FOR SPARK PLUGS

Karl Dietz, Cronberg, and Franz Privinsky, Hofheim, Germany, assignors, by mesne assignments, to Pen-Chlor, Incorporated, Philadelphia, Pa., a corporation of Delaware No Drawing. Application April 17, 1939, Serial No. 268,334. In Germany November 23, 1937

12 Claims. (Cl. 123—169)

The present invention relates to a self-hardening cement for spark plugs.

For the preparation of self-hardening cements and mortars resistant to variations of temperature it has been proposed in several processes known in the industry to use such parent materials for the cement powders as have, if possible, the same properties as the bodies to be cemented with the mortar. Especially in the manufacture of spark plugs where ceramic parts are closely combined with metallic parts and where relatively high temperatures are used and where the parts are subject to wide variations in temperature, it is necessary that the cement powders be capable of resisting these special stresses. For this reason it is advantageous to prepare the cement powders with the aid of such main constituents as are fully identical with the substances of which the ceramic bodies to be cemented consist. In the case of spark plugs containing parts of sintered corundum the main constituents of the cement would have to consist of corundum powder.

In spite of the adaptation described of the main constituents of the cement to the composition of the ceramic parts to be cemented the cements hitherto used for the preparation of spark plugs have not yet satisfied the requirements of the practice, because the substance serving as binding agent for the parent material, preferably a water-glass, hardens in the mixtures used with separation of silicic acid. When the parts are subjected to repeated and wide variations in temperature this silicic acid often causes the cementations to crack or to become leaky.

The present invention relates to a cement for spark plugs of a high resistance to strong heating and to variations of temperature. In this new product the parent material used for the preparation of the cement powder contains as main constituent a pulverulent substance which is chemically indifferent and which has substantially the same coefficient of expansion as the ceramic parts to be cemented. Water-glass is used as binding agent for the cement powder but it is not hardened by drying or by an addition of substances capable of reacting with alkalies such as silicofluorides, which precipitate the silicic acid of the water-glass as such.

According to the present invention the hardening of the water-glass is effected by the formation of silicates.

Mixtures of water-glass and such substances as oxides which react with the silicic acid of the water-glass with formation of silicates are known as such, but they are only used for masses to be cemented in the cold or exposed merely to low temperatures. For the preparation of spark plug cements or similar highly stressed ceramic masses, however, such oxides have not yet been used. It could by no means be expected that the use of these oxides would impart such a surprisingly good thermal stability to the cementations.

The hardening of the cement by the formation of silicates has the advantage that the silicates formed in the finished cementations correspond very closely in chemical constitution and properties to the silicates which are usually used as the heat resistant ceramic materials in spark plugs and to the inert fillers used in the cements therefor. The use of such water-glass mortars forming silicates for the purpose of combining the ceramic and metallic parts of spark plugs is especially suitable because the cement does not crack even under rather high thermal and mechanical stresses but combines closely the different parts of the spark plug.

According to the invention metal oxides are added to the cement powders. There are preferably used metal oxides which are capable of reacting with the alkali silicate, with formation of silicates, to a sufficient extent and with an adequate velocity to cause the hardening of the cement. There may especially be used metal oxides which, at an elevated temperature, do not yield readily fusible silicates, for instance the oxides of zinc, manganese, magnesium and aluminium. Instead of the oxides the hydroxides, carbonates, acetates or similar compounds capable of reacting easily with water-glass may likewise be used. The compounds are preferably used in a form especially porous and capable of absorbing liquids.

The afore described cements are not only suitable for the purpose of combining ceramic and metallic parts of spark plugs, but they may also be used for any desired cementation which has to resist variations of temperature and in any case where the adhesion of the ceramic parts or of the ceramic and metallic parts to be cemented must be as good as possible.

The following example serves to illustrate the invention, but it is not intended to limit it thereto:

94 grams of powdered corundum are mixed with 6 grams of zinc oxide. Made up with 30 cc. of water-glass the mixture yields a cement which hardens by itself after several hours even with exclusion of air and which is excellently suitable for cementing ceramic parts in spark plugs.

We claim:

1. A self-hardening cement for spark plugs obtainable by mixing a cement powder with a water-glass solution, the cement powder containing as main constituent a chemically indifferent pulverulent substance identical with at least one of the substances of which the bodies to be cemented consist and having substantially the same coefficient of expansion as the parts to be cemented in admixture with small quantities of metal compounds which, on making up the cement powder with the water-glass, react with formation of silicates which are infusible at the temperature of operation of spark plugs.

2. A self-hardening cement for spark plugs obtainable by mixing a cement powder with a water-glass solution, the cement powder containing as main constituent a chemically indifferent pulverulent substance identical with at least one of the substances of which the bodies to be cemented consist and having substantially the same coefficient of expansion as the parts to be cemented in admixture with a small quantity of a metal compound selected from the group consisting of oxides, hydroxides, carbonates and acetates which, on making up the cement powder with the water-glass, reacts with formation of silicates which are infusible at the temperature of operation of spark plugs.

3. A self-hardening cement for cementing ceramic and metallic parts of spark plugs obtainable by mixing a cement powder with a water-glass solution, the cement powder containing powdered corundum as main constituent in admixture with small quantities of zinc oxide.

4. A cement powder which, when made up with water-glass, yields a self-hardening cement preferably used for spark plugs and resistant to variations of temperature when hardened, the said cement powder consisting of a mixture containing as main constituent a chemically indifferent pulverulent substance identical with at least one of the substances of which the bodies to be cemented consist and having substantially the same coefficient of expansion as the parts to be cemented in admixture with small quantities of metal compounds which, on making up the cement powder with the water-glass, react with formation of silicates which are infusible at the temperature of operation of spark plugs.

5. A cement powder which, when made up with water-glass, yields a self-hardening cement preferably used for spark plugs and resistant to variations of temperature when hardened, the said cement powder consisting of a mixture containing as main constituent a chemically indifferent pulverulent substance identical with at least one of the substances of which the bodies to be cemented consist and having substantially the same coefficient of expansion as the parts to be cemented in admixture with a small quantity of a metal compound selected from the group consisting of oxides, hydroxides, carbonates and acetates which, on making up the cement powder with the water-glass, reacts with formation of silicates which are infusible at the temperature of operation of spark plugs.

6. A cement powder which, when made up with water-glass, yields a self-hardening cement preferably used for spark plugs and resistant to variations of temperature when hardened, the said cement powder consisting of a mixture containing powdered corundum as main constituent in admixture with small quantities of zinc oxide.

7. The process of cementing together ceramic and metallic parts of spark plugs which consists of interposing between said parts a composition comprising a chemically indifferent pulverulent material identical with the substances of which the ceramic part to be cemented consists and having substantially the same coefficient of expansion as the ceramic parts, water-glass and metal compounds which react with the water-glass to form silicates which are infusible at the temperature of operation of spark plugs and permitting the composition to harden.

8. The process of cementing together ceramic and metallic parts of spark plugs which consists of interposing between said parts a composition comprising a chemically indifferent pulverulent material identical with the substances of which the ceramic part to be cemented consists and having substantially the same coefficient of expansion as the ceramic parts, water-glass and at least one metal compound selected from the group consisting of oxides, hydroxides, carbonates and acetates which reacts with the water-glass to form silicates which are infusible at the temperature of operation of spark plugs and permitting the composition to harden.

9. The process of cementing together ceramic and metallic parts of spark plugs which consists of interposing between said parts a composition comprising powdered corundum as the main constituent in admixture with small quantities of zinc oxide and water-glass and permitting the composition to harden.

10. Spark plugs comprising ceramic and metallic parts cemented together by means of a composition comprising a chemically indifferent filling material identical in composition with the ceramic part to be cemented and having substantially the same coefficient of expansion as the ceramic parts and a silicate formed in situ by the reaction of a metal compound and water-glass, said silicate being infusible at the temperature of operation of the spark plug.

11. Spark plugs comprising ceramic and metallic parts cemented together by means of a composition comprising a chemically indifferent filling material identical in composition with the ceramic part to be cemented and having substantially the same coefficient of expansion as the ceramic parts and a silicate formed in situ by the reaction of a metal compound selected from the group consisting of oxides, hydroxides, carbonates and acetates and water-glass, said silicate being infusible at the temperature of operation of the spark plug.

12. Spark plugs comprising metallic parts and parts made of sintered corundum cemented together by means of a composition comprising powdered corundum as main constituent and a small quantity of zinc silicate formed in situ by the reaction of zinc oxide and water-glass.

KARL DIETZ.
FRANZ PRIVINSKY.